(12) United States Patent
Vadgama

(10) Patent No.: US 7,277,709 B2
(45) Date of Patent: Oct. 2, 2007

(54) CELL SELECTION

(75) Inventor: Sunil Keshavji Vadgama, Thornton Heath (GB)

(73) Assignee: Fujitsu Limited, Kawasaki (JP)

( * ) Notice: Subject to any disclaimer, the term of this patent is extended or adjusted under 35 U.S.C. 154(b) by 314 days.

(21) Appl. No.: 10/209,643

(22) Filed: Jul. 31, 2002

(65) Prior Publication Data

US 2003/0083069 A1    May 1, 2003

(30) Foreign Application Priority Data

Aug. 16, 2001   (GB)   ................................ 0120033.6

(51) Int. Cl.
  *H04Q 7/20*     (2006.01)
  *H04L 12/26*    (2006.01)
(52) U.S. Cl. ...................... 455/453; 455/436; 455/525; 455/452.2; 455/423; 455/435.2; 370/229; 370/230; 370/235; 370/237
(58) Field of Classification Search ................ 455/525, 455/524, 436, 437, 438, 439, 452.2, 453; 370/328, 333, 332, 229, 230, 235, 237
See application file for complete search history.

(56) References Cited

U.S. PATENT DOCUMENTS

| | | | |
|---|---|---|---|
| 5,454,026 A | | 9/1995 | Tanaka |
| 5,774,809 A | | 6/1998 | Tuutijarvi et al. |
| 5,805,993 A | | 9/1998 | Cherpantier et al. |
| 5,815,811 A | | 9/1998 | Pinard et al. |
| 5,933,777 A | | 8/1999 | Rahman |
| 5,940,771 A | * | 8/1999 | Gollnick et al. ............. 455/517 |
| 5,966,662 A | * | 10/1999 | Murto ........................ 455/458 |
| 6,002,676 A | * | 12/1999 | Fleming ..................... 370/328 |
| 6,069,871 A | * | 5/2000 | Sharma et al. .............. 370/209 |
| 6,128,506 A | * | 10/2000 | Knutsson et al. ........... 455/522 |
| 6,141,565 A | * | 10/2000 | Feuerstein et al. .......... 455/560 |
| 6,181,948 B1 | * | 1/2001 | Kondo ........................ 455/517 |
| 6,205,129 B1 | * | 3/2001 | Esteves et al. .............. 370/331 |
| 6,311,065 B1 | * | 10/2001 | Ushiki et al. ............... 455/440 |
| 6,341,222 B1 | * | 1/2002 | Neumiller et al. ....... 455/422.1 |
| 6,434,388 B1 | | 8/2002 | Szalajski |
| 6,522,881 B1 | * | 2/2003 | Feder et al. ................. 455/437 |
| 6,584,325 B1 | * | 6/2003 | Shakhgildian .............. 455/525 |

(Continued)

FOREIGN PATENT DOCUMENTS

EP    0 889 663    1/1999

(Continued)

OTHER PUBLICATIONS

Laakso, et al. Radio Resource Management. WCDMA 2000, pp. 187-219.

(Continued)

*Primary Examiner*—George Eng
*Assistant Examiner*—Huy Phan
(74) *Attorney, Agent, or Firm*—Katten Muchin Rosenman LLP

(57) ABSTRACT

Cell selection techniques for use in cellular communications systems are disclosed. A decision as to whether to use a cell for data transmission is made in dependence on a measure of a congestion level in the cell. The decision may either be part of a cell selection decision, or used to override a cell selection decision. The techniques may be used in fast cell site selection.

33 Claims, 8 Drawing Sheets

U.S. PATENT DOCUMENTS

| | | | |
|---|---|---|---|
| 6,721,567 B1 * | 4/2004 | Wang et al. | 455/440 |
| 6,847,818 B1 * | 1/2005 | Furukawa | 455/442 |
| 6,907,001 B1 * | 6/2005 | Nakayama et al. | 370/230 |
| 7,058,035 B2 * | 6/2006 | English | 370/332 |
| 2001/0027106 A1 * | 10/2001 | Kito | 455/453 |
| 2001/0046879 A1 * | 11/2001 | Schramm et al. | 455/525 |
| 2002/0049039 A1 * | 4/2002 | Natarajan | 455/62 |
| 2002/0102978 A1 * | 8/2002 | Yahagi | 455/437 |
| 2003/0153311 A1 * | 8/2003 | Black | 455/436 |
| 2004/0162073 A1 * | 8/2004 | Yoneyama et al. | 455/436 |

FOREIGN PATENT DOCUMENTS

| | | |
|---|---|---|
| EP | 0 921 701 | 6/1999 |
| EP | 1 022 920 | 7/2000 |
| EP | 1 094 680 | 4/2001 |
| EP | 1 096 823 | 5/2001 |
| GB | 2 173 377 | 10/1986 |
| GB | 2 352 139 | 1/2001 |
| JP | 2001309417 A * | 11/2001 |
| WO | 98/21908 | 5/1998 |
| WO | 98/25429 | 6/1998 |
| WO | 99/59366 | 11/1999 |
| WO | 99/59367 | 11/1999 |
| WO | 02/49237 A2 | 6/2002 |
| WO | 02/49237 A3 | 6/2002 |

OTHER PUBLICATIONS

Raitola, et al. Packet Access. WCDMA 2000, pp. 221-241.

Holma, et al. Physical Layer Performance. WCDMA 2000, pp. 243-282.

TSG-RAN Working Group 1 Meeting#12. Feasibility Study of Advanced Techniques for High Speed Downlink Packet Access. Seoul, Korea Apr. 10-13, 2000, pp. 1-5.

* cited by examiner

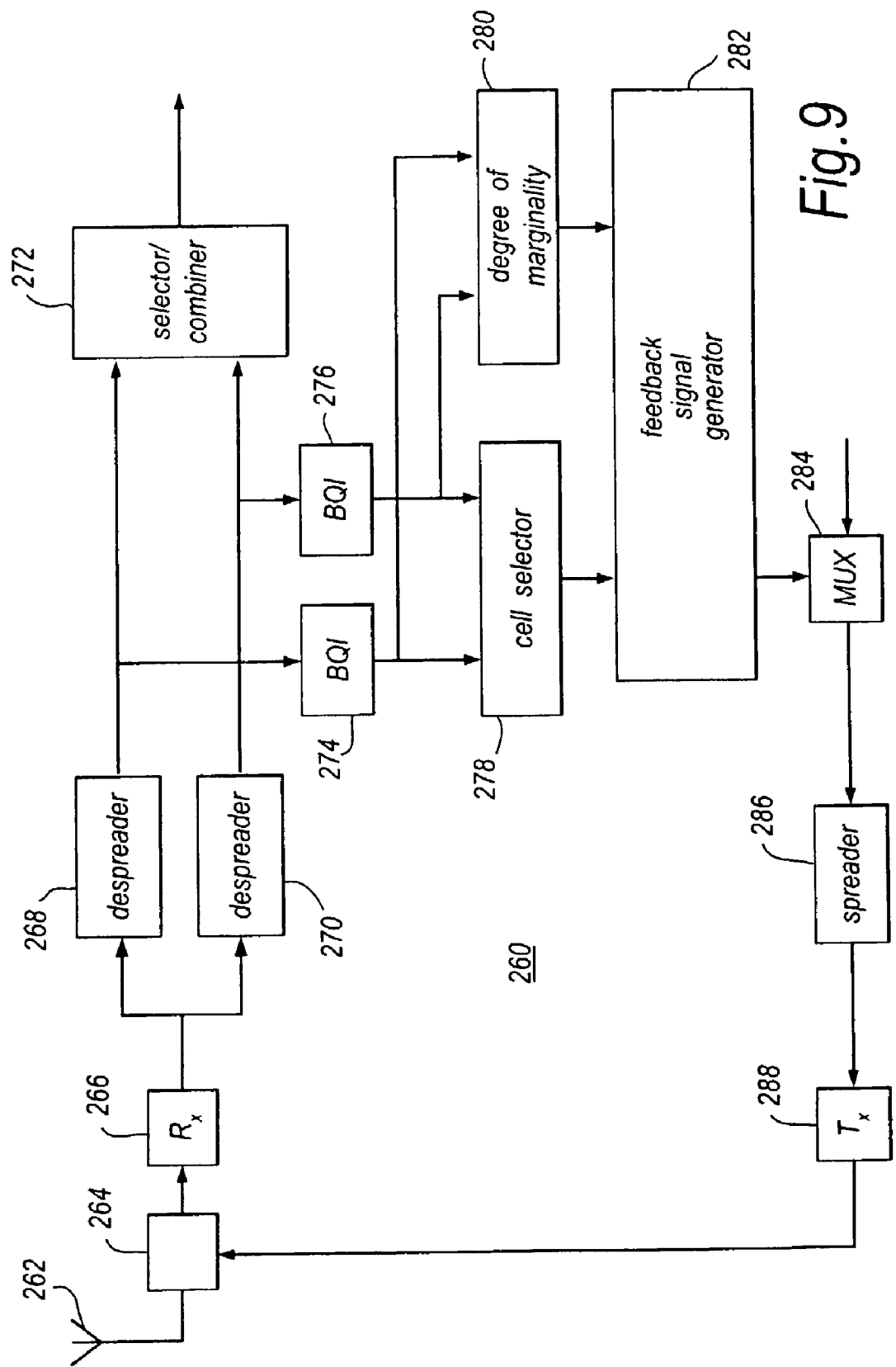

CELL SELECTION

BACKGROUND OF THE INVENTION

The present invention relates to cell selection in a cellular mobile communications system, and in particular to fast cell site selection during soft handover.

In a cellular mobile communications system, each base station has associated with it a cell covering a certain area ("footprint"). A mobile unit within the coverage area of the cell communicates with the system by transmitting radio signals to, and receiving radio signals from, the base station associated with the cell. The shapes and sizes of different cells can be different and may vary over time. The respective coverage areas of adjacent cells generally overlap with one another so that at any given time, a mobile unit may be capable of communicating with more than one base station.

Within each cell, it is necessary for the base station to transmit to each wanted user (i.e. each active mobile unit) in a multi-user and multi-path environment. In order to achieve satisfactory signal detection at low bit error rates, the multi-user interference (MUI), sometimes referred to also as multiple access interference (MAI), must be reduced to an acceptable level. The amount of interference that is experienced in a cell is dependent on the loading in that cell, which is dependent on the number of users and the data rates of those users. The amount of interference generally increases non-linearly as the loading increases. Typically, a threshold is set which specifies the maximum loading in a cell.

At various times, for example during call setup, network acquisition or handover between cells, it is necessary for a mobile unit to perform a cell selection operation, i.e. to select a base station with which to communicate. In known cell selection techniques, the decision as to which cell to use is based on a measure of signal quality within the cells. For example, a mobile unit wishing to set up a call, or to acquire the network, or to perform handover (either hard or soft handover) may measure the qualities of signals received from various base stations and use those measures to select a base station with which to communicate.

In a technique known as Fast Cell Site Selection (FCSS), a mobile unit which is in a soft handover region (i.e. in communication with two or more base stations) selects a single base station with which data communication is to take place every radio frame. The selection is based on the quality of the signals received from the active base stations. The mobile unit transmits the identification number of the selected base station to all of the base stations with which it is in communication. Each of the base stations receives the identification number, and determines whether or not it is the selected base station. The selected base station then transmits data to the mobile unit in the next radio frame, while the other base stations suppress data transmission to that mobile unit in that radio frame.

FCSS can improve the overall performance of a cellular communications system by reducing the number of channels that are transmitted and thus reducing the interference to other users. The technique can also prevent communication from taking place on a channel which has faded. Since the base stations themselves determine whether or not to transmit data (rather than the network), cell selection can be carried out quickly, and thus the system can respond quickly to changes in environmental conditions.

A problem in known cellular communications systems is that, if the selected cell is heavily loaded, then when the mobile unit starts communication with that cell, an undesirably large increase in interference may occur. This is due to the fact that interference increases non-linearly with cell loading. Furthermore, by adding a further mobile unit to a cell which is already heavily loaded, there is a risk that the cell may reach its loading threshold. This may result in, for example, a dropped connection, some users being barred from that cell, the data rates of some users being reduced, or the latency of the system being increased due to buffering of packets. The above problems are particularly compounded where high data rate communication takes place between the selected base station and the mobile unit.

Another problem in cellular communications systems is that loading thresholds are usually set to levels somewhat below the maximum capacities of the cells. This is to allow some reserve capacity, so that, if a new mobile unit enters a cell, the reserve capacity may be used (by temporarily exceeding the loading threshold) to prevent that mobile unit from being barred from the cell. However, setting the loading threshold to a low level may result in less efficient usage of cell capacity in comparison to the case where a higher threshold is set.

A further problem which may arise in particular in high data rate cellular communications systems is that loading levels may change rapidly and it may be difficult for the system to respond quickly to the changes.

It is therefore desirable to provide a system in which some or all of the above problems are reduced.

In International patent publication number WO99/59366 in the name of Fujitsu Limited, the entire subject matter of which is incorporated herein by reference, a technique is disclosed in which, when a mobile unit is capable of transmitting with two or more base stations, a base station for transmission is selected on the basis of which base station would cause the least interference. This technique is effective in reducing interference levels in the system, but it does not address the problems associated with loading thresholds discussed above.

Reference is also made to International patent publication number WO99/59367 in the name of Fujitsu Limited, the entire subject matter of which is incorporated herein by reference, which contains background material of relevance to the present invention.

SUMMARY OF THE INVENTION

The present invention provides, in a first aspect, a cellular communications system for carrying out a site selection diversity method, the system comprising a user equipment and a plurality of base stations. The user equipment comprises a processor operable periodically to select a cell for data transmission from a plurality of cells, and a transmitter operable to transmit a result of the selection to a base station. The base stations each comprise a receiver operable to receive a result of a selection, a transmitter operable to transmit data to the user equipment, and a controller operable to determine whether or not the base station is a selected base station and to control the transmission of data to the mobile unit in dependence on whether or not it is determined that the base station is a selected base station. The processor in the user equipment is operable to select a cell for data transmission based on measures of congestion levels in the cells.

The invention may provide the advantage that, where there are two or more possible cells with which a mobile unit can communicate, cell selection may be based at least in part on which cell is more lightly loaded. By selecting the more lightly loaded cell, the amount of interference may be reduced in comparison to the case where a heavily loaded cell is selected, and the risk of overloading a cell may be reduced. If the system is a packet switched system, then the time for which packets are buffered prior to transmission may be reduced, which may reduce the latency of the system. Furthermore, the present invention may allow a higher loading threshold to be set for a cell, since it is less likely that a mobile unit will overload the cell.

The present invention may also provide the advantage that, since data transmission is controlled by the base station (rather than at network level), the system can respond rapidly to changes in congestion levels. By contrast, if data transmission were controlled by a radio network controller, the latency of the cell selection system would be much longer, and thus the system would not be able to respond so rapidly to changes in congestion levels.

According to a second aspect of the invention there is provided a cellular communications system for carrying out a site selection diversity method, the system comprising:
- a user equipment comprising means for periodically selecting a cell for data transmission from a plurality of cells, and means for transmitting a result of the selection to a base station; and
- a plurality of base stations, each of which comprises means for receiving a result of a selection, means for determining whether or not the base station is a selected base station, and means for controlling the transmission of data to the mobile unit in dependence on whether or not it is determined that the base station is a selected base station;
- wherein the selecting means in the user equipment is arranged to select a cell for data transmission based on measures of congestion levels in the cells.

Preferably the selecting means is arranged to select a cell for data transmission based additionally on measures of signal qualities in the cells, which may improve the selection procedure and enable the system to respond rapidly to changes in environmental conditions. For example, if one cell has significantly less congestion than the other cell, but slightly worse signal quality, then it may be preferred to use the cell with lower congestion. However, if the cell with lower congestion has significantly worse signal quality, then the cell with better signal quality may be preferred. Thus the selecting means may be arranged to select a cell which has the lowest congestion level when the difference in measures of signal qualities between two cells is below a certain threshold.

The measures of signal qualities may be, for example, received signal strength (RSS) or power measures, bit error rate (BER) or frame error rate (FER) measures, or signal-to-interference ratio (SIR) or signal-to-interference-and-noise ratio (SINR) measures. The measures may be based on pilot signals broadcast by the base stations, such as common pilot channel (CPICH) signals, or any other suitable signals. Weighting may be applied to either or both of the measures of signal qualities and the measures of congestion levels.

Where a cell which does not have the best signal quality but which has the lowest congestion level is selected, the data rate may be reduced to ensure satisfactory data transmission, for example by use of adaptive modulation and coding.

In one embodiment the base stations comprise means for measuring congestion levels and means for transmitting measures of congestion levels to the user equipment. In this embodiment the means for measuring congestion levels may be arranged to determine an amount of data which is to be transmitted by the base station over a predetermined time period (preferable a future time period), in order to yield a measure of congestion levels. For example, congestion levels may be measured based on the occupancy of a buffer containing data to be transmitted. The predetermined period may be, for example, one or more radio frames, and may be less than, equal to, or greater than the interval at which a cell selection decision is taken. This technique for measuring congestion levels may provide the advantage that future congestion levels can be predicted, since the measurements may be based on the amount of data which is still to be transmitted.

Alternatively or in addition to the occupancy of a buffer, one or more of the following parameters may be used in order to measure congestion levels: the discard rate of packets; the percentage of packets which are re-transmitted; the total output power of the transmitter; the downlink throughput; and/or any other appropriate parameter. Any combination of parameters may be used with appropriate weighting.

In the above embodiment the transmitting means may be arranged to transmit the measures of congestion levels in a broadcast channel. This can allow any user equipment which can receive the broadcast channel to obtain the measures of congestion levels, and may avoid the need to transmit a measure separately to two or more user equipments in the cell.

In another embodiment the user equipment itself comprises means for measuring congestion levels. The means for measuring congestion levels in this embodiment may be arranged to measure congestion levels, for example, based on the usage of a shared transmission channel. In this example, the user equipment may monitor the shared channel to determine whether any time slots are free in the shared channel. Alternatively, the user equipment may determine the number of signals which are transmitted by a particular base station, or other techniques for measuring congestion levels could be used. This embodiment may provided the advantage that the measures do not need to be transmitted. However, in some circumstances the first embodiment may be preferred because the base station may be able to produce more accurate measures of congestion levels than the user equipment.

The control means in a base station may be arranged to control the transmission of data to the user equipment additionally in dependence on a quality of a signal containing the result of the selection which is received by the base station from the user equipment. For example, if the quality of a signal containing the result of the selection is poor, then the base station may decide not transmit data to the user equipment. This decision may be taken because the communication link with the user equipment is deemed not to be sufficiently good, or because the base station cannot reliably detect the result of the selection, and therefore is not able to determine whether it is the selected base station. The control means may be arranged to suppress data transmission, for example, if the quality of the signal containing the result of a selection is below a certain threshold (which may be fixed or variable). The quality of the signal may be determined, for example, by the number of errors in the signal, or by the signal to noise ratio, or by other means.

The selecting means may be arranged to select a base station based additionally on a command transmitted by a base station to the user equipment instructing the user equipment not to select that base station. For example, a base station may instruct one or more user equipments not to select that base station because the link between the base station and its radio network controller is congested, or because the base station is not able or not willing to transmit the data for some other reason.

The selecting means may be arranged to select a base station based additionally on a priority of data which is to be transmitted. For example, if the data is high priority data, it may be decided to transmit the data in a cell with good signal quality, even if that cell has a high congestion level. If the data is low priority data, it may be decided to transmit that data in a cell which does not have the best signal quality, but which has a low congestion level. In the latter case, the data rate may be reduced to ensure satisfactory data transmission, for example by using adaptive modulation and coding (AMC). An indication of the priority of the data may be transmitted to the user equipment from the base station in any appropriate manner, or the priority of the data may be inferred from the priority of previous data.

The control means in a base station may be arranged to control the transmission of data to the user equipment additionally in dependence on a priority of data to be transmitted, for example by overriding a cell selection decision.

The result of a selection may comprise an identification number of the selected base station, and the determining means may be arranged to compare the received identification number with the identification number of the base station. The identification number may be a temporary identification number which is allocated to the base station for the purposes of soft handover and/or cell selection.

The user equipment may be arranged to select a cell for data transmission and to transmit a result of the selection at a rate of more than once per superframe (which is 26 frames in the 3G specifications). For example, a selection may be carried out at least once every few radio frames, such as every 13, 10, 5, 3, 2 or 1 radio frames, or every few time slots, or even every time slot. A selection may be carried out, for example, at least once every 240, 120, 60, 30, 20, or 10 milliseconds, although intervals of greater than any of these values may also be used. Similarly, the determining means in a base stations may be arranged to determine whether or not the base station is the selected base station at a rate of more than once per superframe, or at any of the rates mentioned above.

The present invention may be used in conjunction with fast cell site selection (FCSS), or with site selection diversity transmit (SSDT), for example as described in the 3rd Generation Partnership Project (3GPP) Technical Specification document 3G TS 25.214 V3.3.3, 5.2.1.4 "Site selection diversity transmit power control", the entire contents of which are incorporated herein by reference. In such a technique, when a mobile unit is in an area where adjacent cells overlap (referred to as a soft handover region), a decision is made as to which base station to use for data communications for the next few time slots or radio frames. The decision is made by the mobile unit, based on the qualities of the radio signals received by the mobile unit, and is transmitted from the mobile unit to the various base stations. Data communication then takes place with the selected base station for the next few time slots or radio frames, after which another decision is taken based on new values of the signal qualities.

The invention also provides, in a third aspect, a base station which carries out a site selection diversity method in a cellular communications system, the base station comprising:

a measurement unit operable to produce a measure of a congestion level in a cell served by the base station;

a receiver operable to receive a result of a selection from a user equipment, the result of a selection indicating a base station to be used for data transmission;

a transmitter operable to transmit data to a user equipment; and a controller operable to determine whether or not the base station is a selected base station, and to control the transmission of data to the user equipment in dependence on whether or not it is determined that the base station is a selected base station and in dependence on the measure of a congestion level in the cell.

The third aspect of the invention may provide the advantage that a decision as to whether or not to transmit data to the user equipment may still be taken at least partially in dependence on congestion levels even when then user equipment does not have measures of congestion levels available when making a cell selection decision. For example, the user equipment may select a cell based on measures of signal qualities. The controller in the base station may be arranged to suppress data transmission to the user equipment (even if it is the selected base station) if the measure of a congestion level is above a certain threshold.

According to a fourth aspect of the present invention there is provided a base station for carrying out a site selection diversity method in a cellular communications system, the base station comprising:

means for producing a measure of a congestion level in a cell served by the base station;

means for receiving a result of a selection from a user equipment, the result of a selection indicating a base station to be used for data transmission;

means for determining whether or not the base station is a selected base station; and means for controlling transmission of data to the user equipment in dependence on whether or not it is determined that the base station is a selected base station and in dependence on the measure of a congestion level in the cell.

The base station may further comprise means for receiving an indication of the degree of marginality of the result of a selection, and the control means may be arranged to control the transmission of data to the user equipment additionally in dependence on the indication of the degree of marginality. By receiving an indication of the degree of marginality (that is, an indication of how close the cell selection decision was), a base station can take the relative merit of its cell into account when deciding whether data transmission should take place with the user equipment. For example, if degree of marginality is high, indicating for example a large difference in signal quality between the selected cell and the next best cell, then data transmission may take place between the selected base station and the user equipment regardless of the congestion level. The indication of the degree of marginality may comprise a number of bits, or a single bit indicating that the decision was either close or not close. In the case of a single bit, this bit may be viewed as a flag giving permission to the base station to override the selection decision made by the user equipment.

The control means may be arranged to control the transmission of data to the user equipment additionally in dependence on a quality of a signal containing the result of the selection which is received by a base station from the user equipment. The control means may be arranged to control the transmission of data to the user equipment additionally in dependence on a priority of data to be transmitted. The base station may further comprise means for transmitting a command instructing a user equipment (or a plurality of user equipments) not to select that base station.

The determining means may be arranged to determine whether nor not the base station is a selected base station at a rate of more than once per superframe. The base station may be arranged to carry out fast cell site selection.

According to a fifth aspect of the invention there is provided a cellular communications system comprising a base station according to the fourth aspect and a user equipment, the user equipment comprising:
- means for receiving transmission signals from a plurality of base stations;
- means for producing measures of qualities of signals received from the base stations;
- means for selecting a cell based on measures of signal qualities; and
- means for transmitting a result of a cell selection decision to a base station.

The selecting means in the user equipment may be arranged to select a base station based additionally on whether a signal is received by the user equipment from the selected base station within a certain time from the transmission of a result of a selection. Such a signal may be an acknowledgement signal from the base station acknowledging that it is the selected base station, or it may simply be the transmitted data. Thus, if the selected base station does not respond with the time period, the user equipment may select another base station. In this way, if the cell selection decision has been overridden by the base station, the user equipment may select another cell after a certain period of time. The time period may be predetermined, or it may be varied, for example in dependence on a measure of a difference in signal qualities, or a distance between the base station and the user equipment.

The user equipment may further comprise means for determining a degree of marginality of a cell selection decision, and means for transmitting an indication of the degree of marginality to the base station.

In any of the above aspects the transmitted data may be any type of data that is to be transferred between the base station and the user equipment, such as voice or video telephony data, or multimedia data such as web pages downloaded from the Internet. The data may be in packet form or any other form, and may be transmitted by a packet channel, a switched channel, or any other type of channel. Data transmission may take place in either or both directions.

In any of the above aspects, the term "congestion levels" may refer to airwave congestion, or to equipment congestion, or to line congestion, or any combination of the above. In any of the above aspects, a user equipment may select one base station, or more than one base station, for data transmission.

The invention also provides a corresponding base station, a corresponding user equipment, and corresponding methods. Features of one aspect of the invention may be applied to any other aspect. Any apparatus features may be applied as method features.

In any of the above aspects, the various features may be implemented in hardware, or as software modules running on one or more processors.

The invention also provides computer programs and computer program products for carrying out any of the methods described herein, and computer readable media having stored thereon programs for carrying out any of the methods described herein. A computer program embodying the invention may be stored on a computer-readable medium, or it could, for example, be in the form of a signal such as a downloadable data signal provided from an Internet web site, or it could be in any other form.

Preferred features of the present invention will now be described, purely by way of example, with reference to the accompanying drawings.

BRIEF DESCRIPTION OF THE DRAWINGS

FIG. 9 shows parts of a mobile unit according to a fourth embodiment of the invention.

DETAILED DESCRIPTION OF THE INVENTION

1. Overview of a Mobile Communications System

Figure 1:
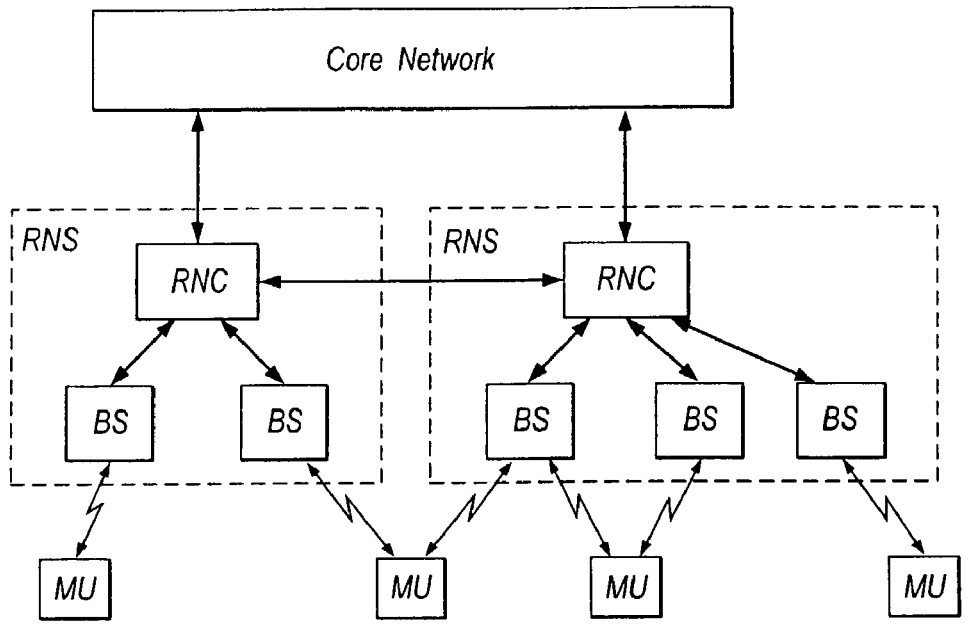
FIG. 1 shows an overview of a mobile communications system.

FIG. 1 shows an overview of a cellular mobile communications system. The system is designed in particular for use with the UMTS (Universal Mobile Telecommunications System) Terrestrial Access Network (UTRA) standard. Further details of the UTRA standard can be found in "WCDMA for UMTS Radio Access for Third Generation Mobile Communications" edited by Harri Holma and Antti Toskala, ISBN 0 471 48687 6, and in the 3rd Generation Partnership Project (3GPP) Technical Specifications, available from the 3GPP Organisational Partners' Publications Offices, the entire contents of which are incorporated herein by reference.

Referring to FIG. 1, the system consists of a number of radio network subsystems (RNSs) connected to a core network. The radio network subsystems handle all radio-related functionality, while the core network is responsible for switching and routing calls and data connections to external networks. Each radio network subsystem comprises a radio network controller (RNC) connected to a number of base stations (BS). The base stations manage the radio links with mobile units within their area of coverage (cells). The radio network controller manages the use of radio resources of its cells; for example it is responsible for handover decisions and load control.

Data is transmitted between the base stations and the mobile units over the air using code division multiple access (CDMA). In CDMA, each channel to be transmitted is spread over a wide spectrum using a unique spreading code. At the receiver the received signal is despread back to the original signal using a replica of the spreading code. By using different spreading codes for different channels, the various channels may be transmitted simultaneously in the same frequency band. Generally the spreading codes are chosen to be orthogonal in order to minimise interference between the channels. CDMA may be used in combination with other multiplexing techniques, such as frequency division multiplexing and time division multiplexing. Each transmission channel may be one of a dedicated channel (reserved for a single user), a common channel (used by all users in a cell) or a shared channel (shared between a number of users on a time division multiplex basis).

Figure 2:
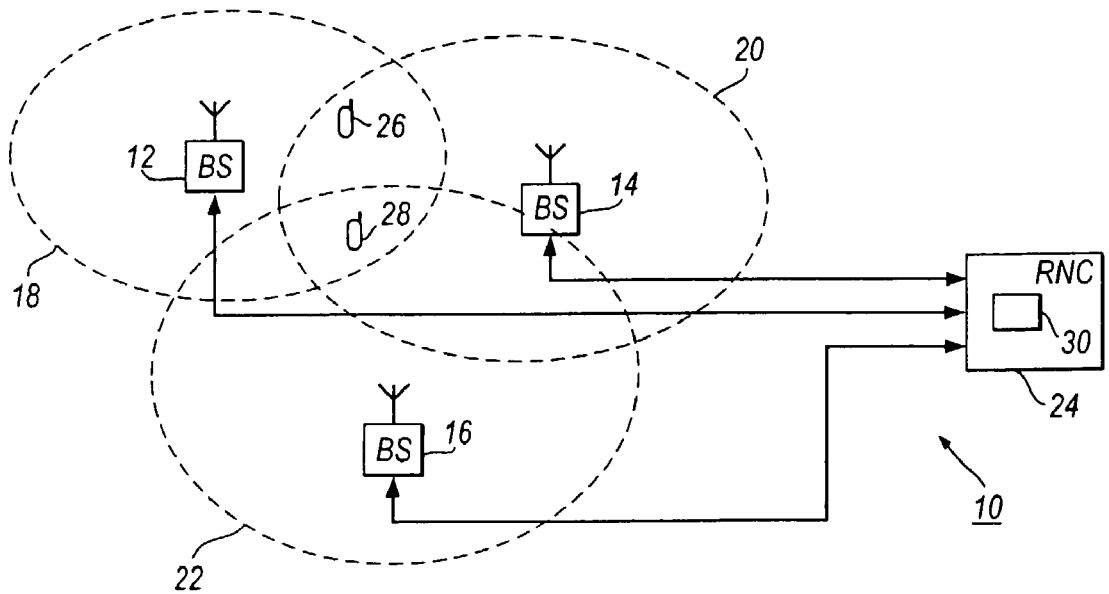
FIG. 2 shows parts of a radio network subsystem.

FIG. 2 shows in more detail parts of a radio network subsystem. Referring to FIG. 2 radio network controller 24 is connected to base stations 12, 14, 16, each of which serves a corresponding cell 18, 20, 22. Each base station 12, 14, 16 can transmit signals to and receive signals from a mobile unit located within its cell 18, 20, 22. Transmission from a base station to a mobile unit is referred to as downlink transmission, and transmission from a mobile unit to a base station is referred to as uplink transmission. In the present description the term "mobile unit" is used to describe a user equipment, although it will be appreciated that the user equipment is not necessarily mobile, but is simply capable of wireless communication with the cellular communications system.

In the radio network controller 24 a packet scheduler is provided which allocates channel resources (i.e. traffic channels, or parts of traffic channels) to the various users. The channel resources are allocated in dependence on various factors, such as interference levels within the cells, cell loading, the amount of data, and the nature of the data (for example, whether or not is it time critical). The rate at which the data of an individual user is transmitted may be adjusted in order to ensure that the various requirements for system performance are met. The packet scheduler 30 then sends packets for transmission to one or more of the base stations 12, 14, 16 where they are inserted into the appropriate channel for transmission to the mobile unit.

If a mobile unit is located in a region where two or more cells overlap, then a soft handover may take place between those cells. During soft handover, a mobile unit is in communication with two or more base stations concurrently. For example, in FIG. 2, mobile unit 26 is in an area served by base stations 12 and 14, and thus can communicate with both of those base stations, while mobile unit 28 is located within a area served by all three base stations 12, 14, 16, and thus can communicate with all three base stations. Soft handover is used to enable a controlled handover to take place when a mobile unit moves from one cell to another, and to take advantage of overlapping cell coverage to increase signal quality. If the mobile unit remains in a soft handover region, then it can continue to take advantage of the base station diversity indefinitely.

During soft handover, the mobile unit maintains a list of active base stations which are involved in the soft handover operation. The active list is updated as the signal from one base station weakens and that from another base station strengthens. In one possible algorithm, all of the base stations whose signals exceed a certain threshold are added to the active set.

In another algorithm the relative strengths of the various signals are taken into account, to compensate for the fact that a mobile unit may only receive weak signals from all base stations.

In a technique known as Fast Cell Site Selection (FCSS), when a mobile unit is in a soft handover region, the mobile unit periodically selects a single base station with which data communication is to take place. When a base station has been selected, data communication takes place with just that base station in the next radio frame, after which another selection decision is made. The selection is based on the quality of the signals received from the active base stations. This technique can improve overall system performance, by reducing the number of channels that are transmitted and thus reducing the interference to other users. The technique can also prevent communication from taking place on a channel which has faded.

In FCSS, each active base station is assigned a temporary identification number (ID). The mobile unit measures the downlink radio channel quality from each active base station and selects the base station with the best radio channel quality. The mobile unit then transmits the identification number of the selected base station to all active base stations. In response, the selected base station transmits an acknowledgement of the selection message to the mobile unit. The selected base station then transmits packets to the mobile unit in the next radio frame, while other (non-selected) base stations cease transmitting packets to the mobile unit. However, control channels continue to be transmitted so that the mobile unit can continue to monitor the quality of the signals from the base stations, and respond to any changes.

A mobile unit typically transmits the ID of a selected base station every radio frame. Since the result of the selection is acted on by the base station itself, rather than being passed to the radio network controller, it is possible for cell selection decisions to be acted on quickly, for example once every radio frame. This allows the system to respond rapidly to changes in environmental conditions. By contrast, if it were the radio network controller which instructed the base stations to transmit, the latency of the system would be considerably longer because of the extra time involved in communicating between the user equipment, the radio network controller and the base stations.

2. First Embodiment

In a first embodiment of the invention, the FCSS technique described above is modified such that the selection of a cell for data transmission is based at least partially on the amount of congestion in the active cells. In this embodiment, each base station broadcasts at regular intervals (e.g. every radio frame) its congestion level for the next one or more radio frames. The mobile unit receives these broadcast messages, and whenever the difference in signal qualities between two cells is below a certain threshold, the mobile unit selects the cell with the lowest congestion.

The present embodiment stems from the recognition that, if one active cell is more lightly loaded than another active cell, then in certain circumstances it might actually be preferable to use the more lightly loaded cell even if the signal quality in that cell is not as good as in the other cell.

Figure 3:
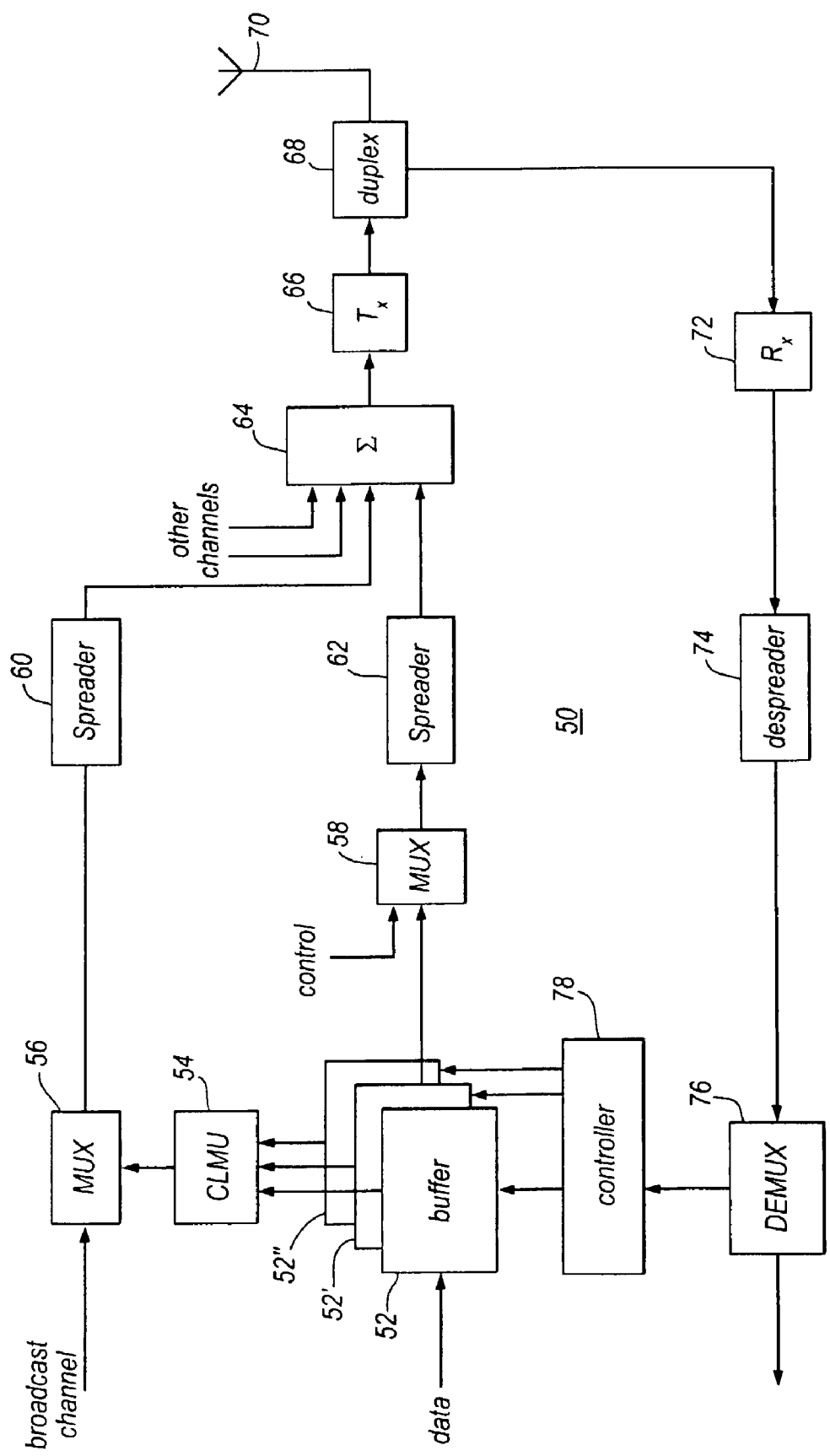
FIG. 3 shows parts of a base station according to a first embodiment of the invention.

Parts of a base station in the first embodiment for transmitting signals to a mobile unit are shown in FIG. 3. The base station 50 comprises data buffers 52, 52', 52", congestion level measurement unit (CLMU) 54, multiplexer 56, multiplexer 58, spreaders 60, 62, combiner 64, transmitter 66, duplexer 68, antenna 70, receiver 72, despreader 74, demultiplexer 76 and controller 78.

In operation, data packets for transmission to the mobile unit are received from the radio network controller (not shown in FIG. 3) and buffered in buffer 52. The other buffers 52', 52" buffer data for transmission to other mobile units. Each of the buffers 52, 52', 52" outputs a signal indicating the number of packets that are currently stored in the buffer to the congestion level measurement unit 54. The congestion level measurement unit 54 uses the signals indicating the number of stored packets to estimate the congestion level in the cell served by the base station. For example, if many packets are buffered, such that there is a delay of one or more radio frames between a packet arriving in the buffer and being transmitted, then it may be assumed that the cell is heavily loaded. If relatively few packets are buffered, then it may be assumed that the cell is lightly loaded. The congestion level measurement unit 54 may take into account expected congestion levels over the next few radio frames, to allow for the feedback delay. Since congestion levels over the next few radio frames will depend on the amount of data stored in the buffer, measuring the congestion levels in this way allows the congestion levels over the next one or more radio frames to be anticipated.

Other parameters may be used by the congestion level measurement unit 54 as well as or instead of the number of buffered packets, to obtain a measure of the congestion level in the cell. For example, one or more of the following parameters could be used:

The total output power of the transmitter.

The downlink throughput. This may be calculated by summing the allocated bit rates of each of the downlink channels.

The discard rate of packets. For example, packets may have a time to live (TTL) indicator, and when this expires the packet may be discarded. The rate at which packets are discarded in this way may be used as a measure of the congestion level.

Rate of retransmission of packets received with errors (i.e. the percentage of packets which are retransmitted).

Any combination of the above or other parameters may be used to obtain a measure of the congestion level in the cell. Weighting may be given to one or more of the parameters as appropriate.

The congestion level measurement unit 54 outputs a signal indicating the congestion level in the cell. The number of possible congestion levels can be one or more. In a simple case, a congestion flag is set whenever the congestion level in the cell is above a certain threshold, or alternatively, a "not-congested" flag is set whenever the congestion level is below a threshold. The threshold may be preset, or dynamically controlled by the radio resource management algorithm in the radio network controller. In more complex cases the output comprises a digital value which may take a number of different levels.

The output of the congestion level measurement unit 54 is fed to multiplexer 56 where it is added to a channel known as the broadcast channel (BCH). The broadcast channel is a common transport channel which is used to transmit information to all of the base stations in the cell. For example, the broadcast channel may be used to broadcast information such as which spreading codes and time slots are available in that cell, and the identification number of the base station. In this embodiment, the broadcast channel is also used to broadcast the measured congestion levels for the cell. The broadcast channel is then fed to spreader 60, which spreads the broadcast channel with the spreading code that is used for that channel.

Data packets are fed out from the buffer 52 in dependence on a signal from the controller 78. The output data packets are fed to multiplexer 58, which multiplexes the data packets with control information to produce a channel for transmission to the mobile unit. Any suitable form of multiplexing may be used, such as time multiplexing or code multiplexing. In the later case, multiplexer 58 may be omitted and a separate spreader provided for the control channel. If a shared channel is to be used for transmission to the mobile unit, then the output from multiplexer 58 is multiplexed with the control and data signals for other mobile units in a further multiplexer (not shown) to form the transmission channel. The transmission channel is then fed to spreader 62, which spreads the channel in accordance with the spreading code that is to be used for that channel.

The outputs of spreaders 60 and 62, together with other spread signals which are to be transmitted in the cell, are combined in combiner 64 and then fed via transmitter 66 and duplexer 68 to antenna 70 for transmission to the mobile units. A beamformer (not shown) may be used to produce a directional transmission beam for transmitting the signal.

Signals from the mobile unit are received by receiver 72 and fed to despreader 74. The output of the despreader 74 is fed to demultiplexer 76 which extracts a feedback signal sent by the mobile unit. As will be explained, the feedback signal contains the identification number of the or each base station which has been selected by the mobile unit for data communication. The feedback signal is fed to controller 78, which contains scheduling algorithms and policies which are used for feeding data out of the data buffers 52, 52', 52". Example scheduling algorithms are given in Chapter 10.4 of "WCDMA for UTMS" by Holma et al, cited above. The controller 78 also controls the buffer 52 in dependence on the feedback signal.

If the feedback signal contains the identification number of the base station 50, then data packets are fed out from the buffer 52 and multiplexed with the control channel by multiplexer 58, so that both control and data channels are transmitted to the mobile unit. The base station may also send an acknowledgement of the feedback signal to the mobile unit. If the feedback signal contains the identification number of another base station (and not that of base station 50) then data packets are not fed out from buffer 52, so that only the control channel is transmitted to the mobile unit. In this way, data packets are only transmitted to the mobile unit if the base station 50 is a base station which has been selected by the mobile unit for the transmission of data.

If the uplink quality is poor, then the base station may not be able to detect the feedback signal reliably. In the present embodiment, if the quality of the signals received from the mobile unit are below a certain threshold, then the base station assumes that it is not the selected base station, and does not transmit data packets. This assumption is likely to be correct since the downlink signal quality is related to the uplink signal quality. However, if the assumption is incorrect, then the mobile unit will not receive an acknowledgement of the feedback signal from the base station, and in that case the mobile unit selects another base station.

In the present embodiment, the control channel is transmitted to the mobile unit even when data packets are not being transmitted by the base station. In this way, the control channel can be used by the mobile unit to monitor the signal quality. Such control channels may be needed in any case, for example, for fast power control. In alternative embodiments, a shared channel, such as a Common Pilot Channel, could be used by the mobile unit to monitor the signal quality, in which case the control channel need not be transmitted by the non-selected base stations.

Figure 4:
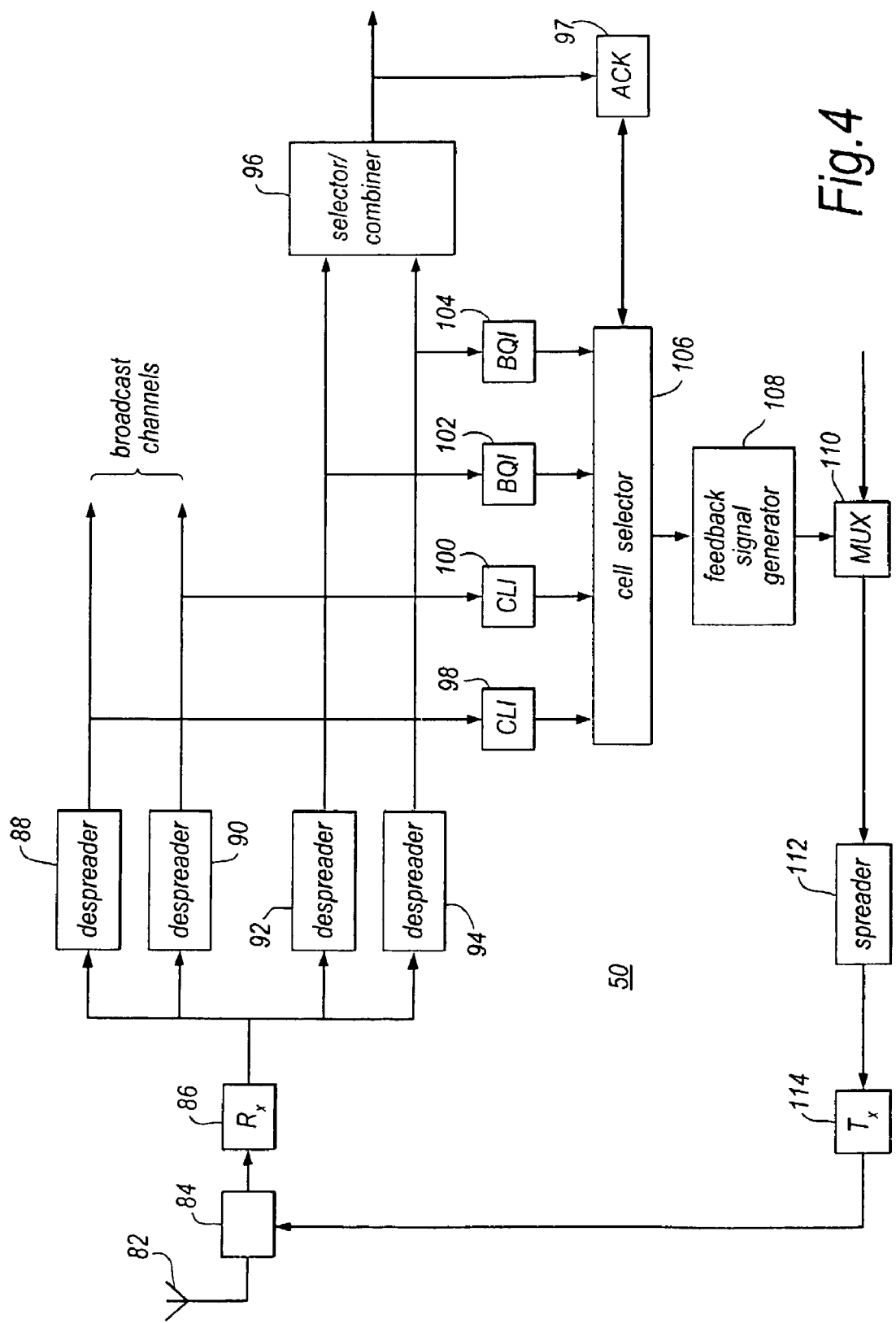
FIG. 4 shows parts of a mobile unit according to the first embodiment.

Parts of a mobile unit according to the first embodiment are shown in FIG. 4. The mobile unit 50 comprises antenna 82, duplexer 84, receiver 86, despreaders 88, 90, 92, 94, selector/combiner 96, acknowledgement detector 97, congestion level indicators 98, 100, beam quality indicators 102, 104, cell selector 106, feedback signal generator 108, multiplexer 110, spreader 112 and transmitter 114.

In operation, the antenna 82 receives radio frequency signals from various base stations and passes these signals to duplexer 84, which separates received and transmitted signals. The receiver 86 down-converts and digitises the received signals. The received signals are then despread by means of despreaders 88, 90, 92, 94.

Each of the despreaders 88, 90 is allocated to the broadcast channel of an active base station, and each of the despreaders 92, 94 is allocated to a dedicated (or shared) transmission channel from an active base station. Each despreader 88, 90, 92, 94 despreads the received signal using a replica of the spreading code which was used by the channel to which it is allocated. Thus, despreaders 88, 90 output the broadcast channels from respective base stations, and despreaders 92, 94 output the dedicated (or shared) transmission channels from respective base stations. Additional despreaders are allocated to the broadcast channels and the dedicated (or shared) transmission channels of other active base stations, if present.

The outputs of despreaders 92, 94 are fed to selector/combiner 96, which selects or combines the signals to yield an output signal for further processing. The outputs of despreaders 92, 94 are also fed to beam quality indicators 102, 104. The beam quality indicators 102, 104 produce measures of the quality of the signals received from the various base stations. Any suitable measure of quality can be produced; for example, a received signal strength (RSS) or power measure, a bit error rate (BER) or a frame error rate (FER) measure, or a signal-to-interference ratio (SIR) or a signal-to-interference-and-noise ratio (SINR) measure could be produced. The measure could be based on a pilot signal broadcast by the base station.

For example, the strength of the pilot signal could be taken as a measure of signal quality, or the base station may also broadcast the transmit power ratio of a data channel to the pilot channel, and this ratio could be used in conjunction with the pilot signal strength to obtain a measure of signal quality. Alternatively the measure could be derived from transmission power control (TCP) information (such as a power up/power down instruction) generated in the mobile unit for downlink power control purposes. Any of the measures could be based on a history or average of measurements taken over several measurement periods (e.g. time slots) to avoid possible instability when two or more of the transmission paths have approximately the same instantaneous quality. The measures produced by the beam quality indicators 102, 104 are fed to cell selector 106.

The output of despreaders 88 and 90 yield the broadcast channels from the respective base stations which are used for further processing. The outputs of despreaders 88, 90 are also fed to congestion level indicators 98, 100. Congestion level indicators 98, 100 produce measures of the congestion levels in the cells served by each of the active base stations. In this embodiment, the congestion level indicators 98, 100 extract measures of the congestion levels from the broadcast channels which are received from the active base stations. The measures of the congestion levels are fed to cell selector 106.

Based on the signals received from congestion level indicators 98, 100 and beam quality indicators 102, 104, the cell selector 106 selects one of the active base stations to be the base station with which data communication is to take place. The selection is carried out as follows:

If the difference in the signal quality between the two base stations is greater than a certain threshold (for example, 0.5 or 1 dB) then the base station having the best signal quality is selected. The threshold may be predetermined, or it may be controlled by the network using control signals sent periodically from the network to the mobile unit. The threshold may also be varied in dependence on the priority of the data which is to be transmitted.

If the difference in the signal quality between the two base stations is less than the threshold then the base station having the least congested cell is selected.

If both base stations have the same or similar signal qualities and congestion levels, then alternative criteria are used to select a base station. For example, the base station with which communication last took place may be selected, which may avoid the need to set up a new transport channel for data communication. Alternatively, both (or all) of the active base stations may be selected, for example, if the signal qualities from both base stations are low.

In an alternative implementation, the congestion levels from the respective base stations are given one weight and the corresponding signal qualities are given another weight, and the base station having the best overall measure is selected for data communication.

The result of the selection is fed to feedback signal generator 108. Feedback signal generator 108 produces a feedback signal for transmission from the mobile unit to the base stations, which feedback signal contains the identification number of the selected base station. The feedback signal is fed to multiplexer 110 to be inserted into a signal for transmission from the mobile unit to the base stations. The feedback signal is sent in a signalling channel, which uses sufficient transmission power and forward error correction coding to ensure that in most circumstances the signal can be correctly received by all of the active base stations. The signalling channel is spread by spreader 112 and then transmitted to the active base stations via transmitter 114, duplexer 84 and antenna 82. The selected base station then transmits data packets to the mobile unit, while the non-selected base stations do not.

The above selection procedure is carried out periodically, for example, once every few time slots or once every radio frame (10 ms in the UMTS standard) or once every few radio frames. In this way the system can respond quickly to changes in congestion levels in the cells and to changes in the transmission conditions. For example, if the signal from a base station is subject to fast fading, then the suitability of that base station for data transmission may change over the course of a few radio frames. In addition, packet data is generally bursty in nature, and so if such data is being transmitted, congestion levels within a cell may also change rapidly. By continually measuring both signal qualities and congestion levels, the best cell for transmission at any one time can be determined.

The acknowledgement unit 97 monitors acknowledgement messages which are received from the selected base station. If no acknowledgement message is received from a selected base station after a certain time period (for example, a number of time slots or one or more radio frames) then the acknowledgment unit 97 instructs the cell selector 106 to select another base station regardless of the congestion levels and signal qualities.

In variants of the first embodiment, the measured congestion levels are transmitted in dedicated or shared transport channels, rather than in the broadcast channel. For example, the measured congestion levels may be part of the control channel which is multiplexed with data packets in multiplexer 58 in FIG. 3. In that case, congestion level indicators 98, 100 in FIG. 4 may extract the measures of the congestion levels from the outputs of despreaders 92, 94.

The selection of a base station for data transmission may be based on the nature of the data, as well as the signal qualities and congestion levels. Thus, if the data to be transmitted has a high priority, then the cell with the best signal quality may be selected, even if that cell is congested. If the data has a lower priority, then a poorer quality but more lightly loaded cell may be used. In the latter case, the data rate may be reduced to allow acceptable data transmission to take place in the selected cell. This may be achieved, for example, through the use of Adaptive Modulation and Coding (AMC). The data type may be another weighted factor in the selection decision.

In the present embodiment, the situation where a cell has been selected, but use of that cell is barred due to congestion, may be avoided by using a cell with a lower congestion level. This may allow the radio network controller to set higher loading thresholds for the cells, which may result in an improvement in system capacity.

In certain circumstances a mobile station may be barred from using a particular base station for reasons other than congestion on the radio link. For example, the link between the radio network controller and the base station may be congested, preventing the mobile unit from using that base station, or the base station may be short of resources. In such circumstances, the base station may send a barring command to the mobile unit telling it not to select that base station. Such a barring command could be sent to an individual mobile unit, or to a group of mobile units (for example, mobile units with a lower service priority) or to mobile units with a particular class of service (for example, lower priority traffic, or a high data rate service, or a non-time critical service).

While data transmission from the base station to the mobile unit has been described above by way of example, it will be appreciate that data may alternatively or additionally be transmitted from the mobile unit to the base station.

3. Second Embodiment

In a second embodiment of the invention, the FCSS technique described above is again modified such that the selection of a cell for data transmission is based at least partially on the amount of congestion in the active cells. However, in the second embodiment, the mobile unit itself measures cell congestion levels.

In the second embodiment, shared transmission channels are used for transmitting data from base stations to several mobile units. A mobile unit which is in a soft handover region monitors the shared transmission channels from the active base stations to obtain measures of the cell congestion levels. Whenever the difference in signal qualities between two cells is below a certain threshold, the mobile unit selects the cell with the lowest congestion.

Figure 5:
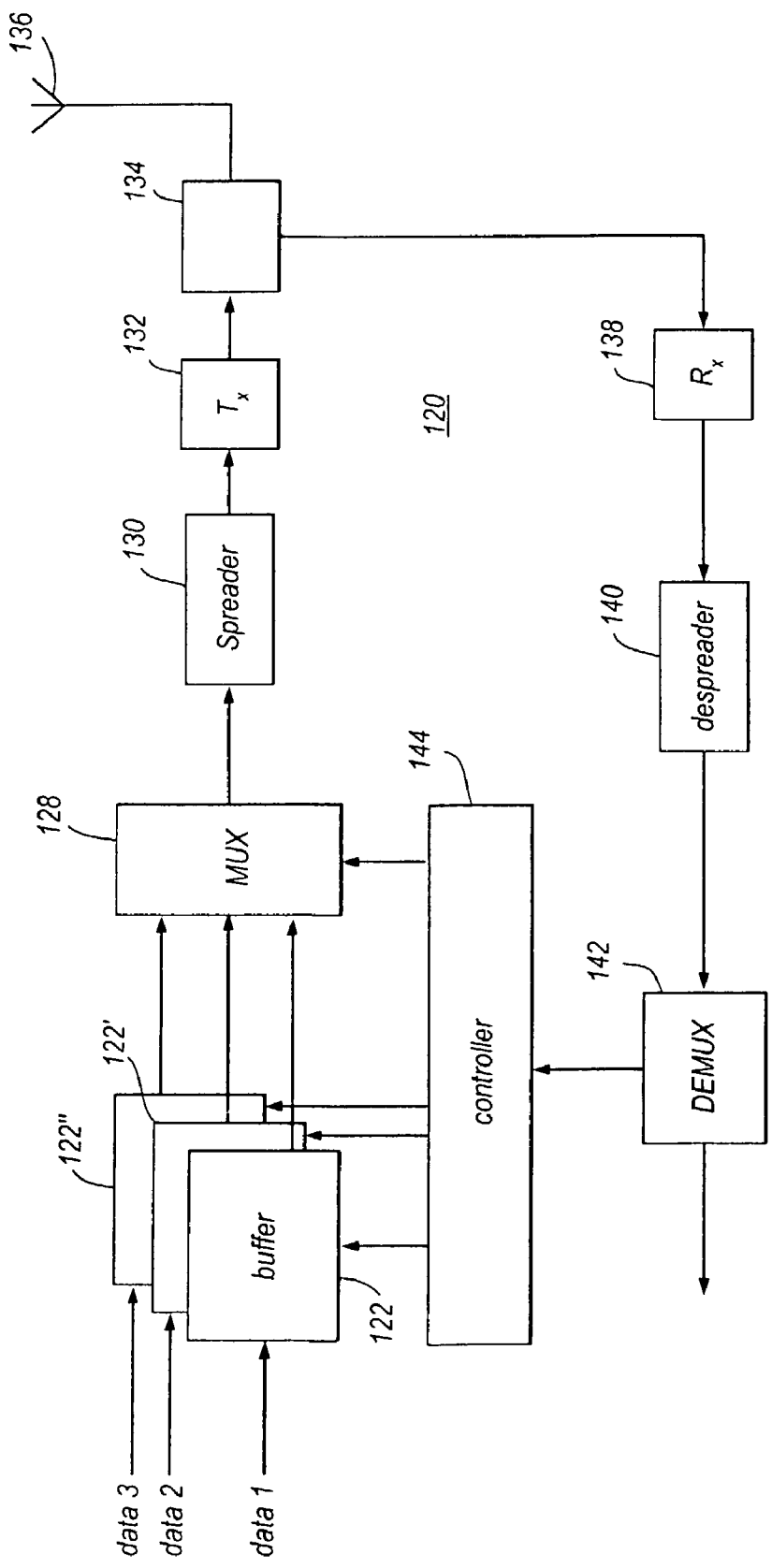
FIG. 5 shows parts of a base station according to a second embodiment of the invention.

Parts of a base station in the second embodiment for transmitting signals to a mobile unit are shown in FIG. 5. The base station 120 comprises data buffers 122, 122', 122", multiplexer 128, spreader 130, transmitter 132, duplexer 134, antenna 136, receiver 138, despreader 140, demultiplexer 142 and controller 144.

In operation, data packets for transmission to three different mobile units are received from the radio network controller and buffered in buffers 122, 122', 122". Data packets are fed out from buffers 122, 122', 122" according to scheduling algorithms and policies resident within the controller 144. The various output data packets are multiplexed with control information in multiplexers (not shown) and then fed to multiplexer 128. Multiplexer 128 multiplexes the signals which are to be transmitted to the various mobile units using time division multiplexing to produce a shared channel. The shared channel may be, for example, a Downlink Shared Channel (DSCH) or Enhanced Downlink Shared Channel (E-DSCH), as defined in the UMTS standards. The shared channel is then fed to spreader 130, which spreads the signal in accordance with the spreading code that is to be used for that channel. The output of spreader 130 is fed via transmitter 132 and duplexer 134 to antenna 136 for transmission to the various mobile units.

Signals from a mobile unit are received by receiver 138 and fed to despreader 140. The output of the despreader 140 is fed to demultiplexer 142 which extracts a feedback signal sent by the mobile unit. As in the first embodiment, the feedback signal contains the identification number of the or each base station which has been selected by the mobile unit for data communication. The feedback signal is fed to controller 144, which controls the buffers 122, 122', 122" and the multiplexer 128 in dependence on the feedback signal. If the feedback signal contains the identification number of the base station 120, then data packets are fed out from the buffer 122 and multiplexed with other data packets by multiplexer 128. If the feedback signal contains the identification number of another base station (and not that of base station 120) then data packets are not fed out from buffer 122. In one implementation, time slots that would otherwise have been allocated to the data packets from buffer 122 are left empty. Alternatively, the scheduler algorithms may be adapted based on the feedback signal, so that, for example, some of time slots that would otherwise be empty are filled by packets from the buffers 122', 122".

The number of buffers 122, 122', 122" which are provided depends on the number mobile units to which data packets are to be sent using the shared channel. If data packets are only to be sent to a few mobile units, then the output of multiplexer 128 will tend to have empty time slots. As will be explained, this can be used by the mobile unit as an indicator of the congestion level in the cell.

Figure 6:
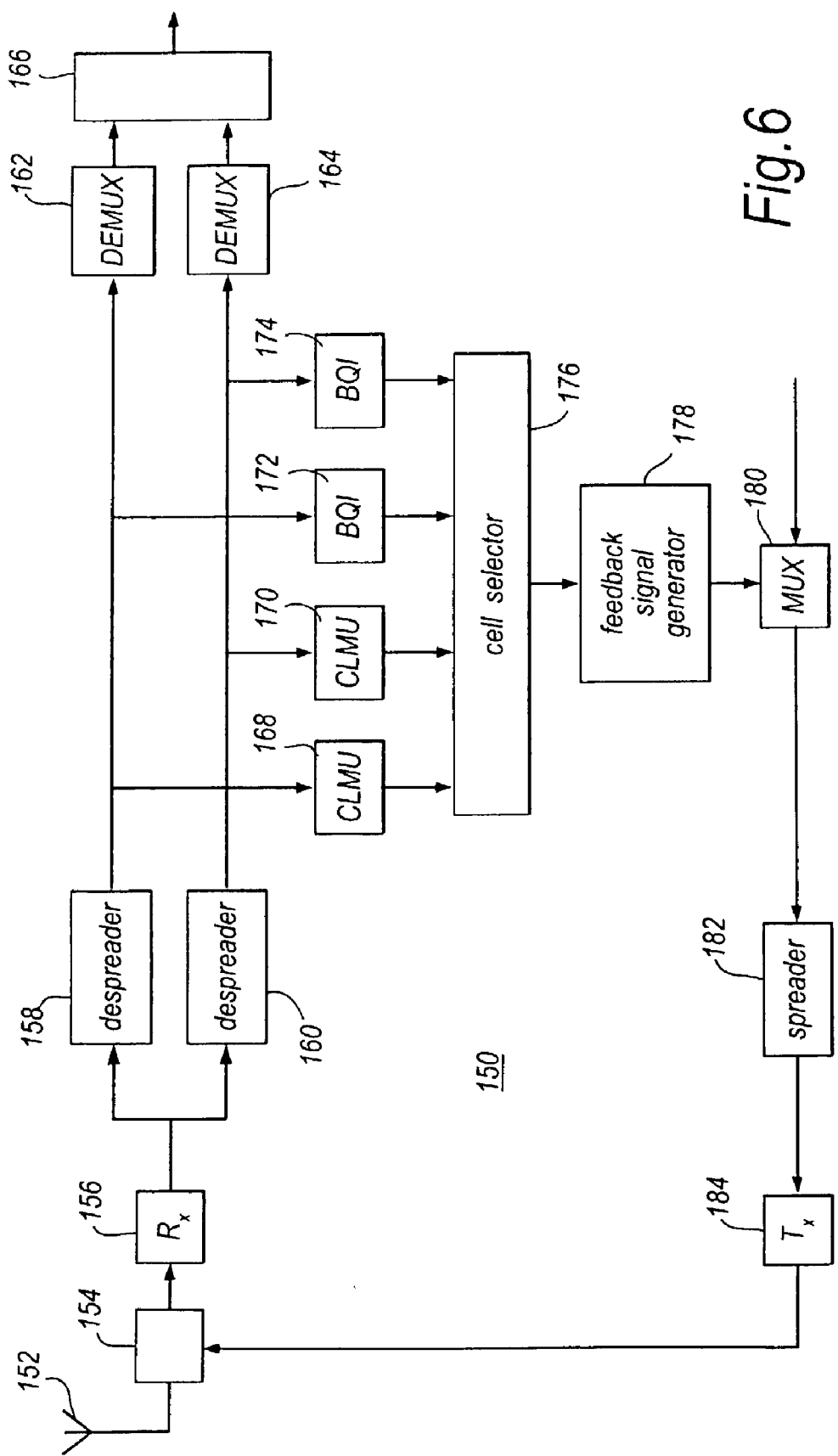
FIG. 6 shows parts of a mobile unit according to the second embodiment.

Parts of a mobile unit according to the second embodiment are shown in FIG. 6. The mobile unit 150 comprises antenna 152, duplexer 154, receiver 156, despreaders 158, 160, demultiplexers 162, 164, selector/combiner 166, congestion level measurement units 168, 170, beam quality indicators 172, 174, cell selector 176, feedback signal generator 178, multiplexer 180, spreader 182 and transmitter 184. An acknowledgement unit (not shown) corresponding to that in the first embodiment may also be provided.

Each of the despreaders 158, 160 is allocated to the shared transmission channel of an active base station, and despreads the received signal using a replica of the spreading code which was used by that channel. The outputs of despreaders 158, 160 are fed to demultiplexers 162, 164 respectively, which demultiplex the shared channels to obtain the data signals for the mobile unit 150. These signals are selected or combined by selector/combiner 166 to yield an output signal for further processing.

The outputs of despreaders 158, 160 are fed to congestion level measurement units 168, 170. The congestion level measurement units measure the congestion levels in the respective cells by monitoring the shared transmission channels. If a shared transmission channel has empty time slots, then this is taken as an indication that the cell is lightly loaded. If there are no, or very few, empty time slots, this is taken as an indication that the cell is heavily loaded. The measured congestion levels are fed to cell selector 176.

Alternative techniques to that described above may be used for measuring the congestion levels. For example, the mobile unit may determine the number of transmission channels that it can receive from a particular base station, and use this as an indication of the congestion levels in the cell, or it may use a measure of a delay in receiving data packets as an indication of congestion levels. The mobile unit may use the total power of the shared downlink channel as a measure of the congestion level, or it may use the power ratio of the shared channel to a pilot channel, in order to compensate for the effect of fading. Other techniques that could be used for determining the congestion levels include measuring the number of retransmissions required for a particular radio packet, and measuring the proportion of radio frames that are received in error. Any combination of techniques may be used in order to obtain the measures of the congestion levels.

The outputs of despreaders 158, 160 are also fed to beam quality indicators 172, 174, which produce measures of the quality of the signals received from the various base stations. As in the first embodiment, any suitable measure of quality can be produced. The measures produced by the beam quality indicators 172, 174 are fed to cell selector 176.

Based on the signals received from congestion level measurement units 168, 170 and beam quality indicators 172, 174, the cell selector 176 selects one of the active base stations to be the base station with which data communication is to take place. The selection may be carried out in any of the ways described with reference to the first embodiment. The result of the selection is fed to feedback signal generator 178, which produces a feedback signal containing the identification number of the selected base station. The feedback signal is multiplexed with a signal for transmission by multiplexer 180, and then transmitted to the active base stations via spreader 182, transmitter 184, duplexer 154 and antenna 152. The selected base station then transmits data packets to the mobile unit, while the non-selected base stations do not.

An advantage of the second embodiment in comparison to the first embodiment is that congestion levels do not need to be broadcast by the base station. However, the first embodiment may have the advantage that congestion levels can be more accurately determined at the base station than at the mobile unit, and that the mobile units may be less complex.

4. Third Embodiment

In a third embodiment of the invention, the FCSS technique described above is used to select a cell for data transmission, and in addition the congestion level in the cell is measured by the base station. If the selected cell is too congested the base station does not transmit data to a particular mobile unit, even if the mobile unit has selected the base station for data transmission. The base station may wait until its cell is less congested to transmit the data packets, or the data packets may be transmitted by another base station.

Figure 7:
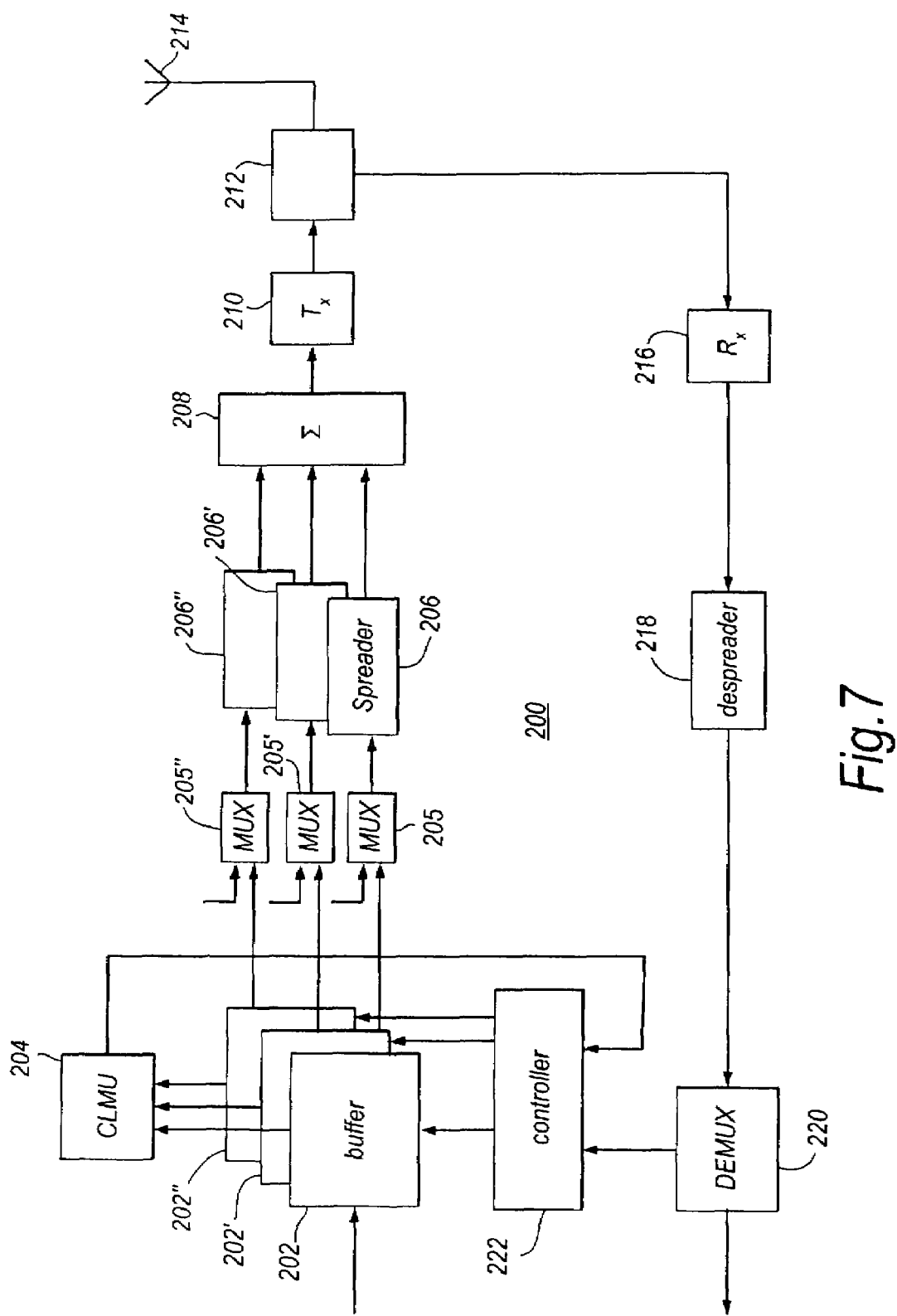
FIG. 7 shows parts of a base station according to a third embodiment of the invention.

Parts of a base station in the third embodiment for transmitting signals to a mobile unit are shown in FIG. 7. The base station 200 comprises data buffer 202, congestion level measurement unit (CLMU) 204, multiplexers 205, 205', 205", spreader 206, combiner 208, transmitter 210, duplexer 212, antenna 214, receiver 216, despreader 218, demultiplexer 220 and controller 222.

In operation, data packets for transmission to the mobile unit are received from the radio network controller and buffered in buffer 202. Other buffers 202' and 202" are also provided which buffer data for transmission to other mobile units. Each of the buffers 202, 202', 202" outputs a signal indicating the number of packets that are currently stored in the buffer to the congestion level measurement unit 204. The congestion level measurement unit 204 uses the signals indicating the number of stored packets to estimate the congestion level in the cell served by the base station. Alternatively, the total transmission power of the base station may be used as a measure of the congestion level in the cell, or any other technique, such any of those discussed above with reference to the first and second embodiments, may be used to estimate the congestion level. The output of the congestion level measurement unit 204 is fed to controller 222.

Data packets are fed out from the buffer 202 in dependence on a signal from the controller 222. The output data packets are multiplexed with control information by multiplexer 205 to yield a channel for transmission. The transmission channel is then fed to spreader 206, which spreads the signal in accordance with the spreading code that is to be used for that particular channel. Similarly, the outputs of buffers 202' and 202" are multiplexed with control information and fed to spreaders 206' and 206" which spread the signals with respective spreading codes. The outputs of spreaders 206, 206' and 206" are then combined in combiner 208, and fed via transmitter 210 and duplexer 212 to antenna 214 for transmission to the mobile units.

Signals from the mobile unit are received by receiver 216 and fed to despreader 218. The output of the despreader 218 is fed to demultiplexer 220 which extracts a feedback signal sent by the mobile unit. As in the first and second embodiments, the feedback signal contains the identification number of the or each base station which has been selected by the mobile unit for data communication. However, in the present embodiment, the feedback signal contains the identification number of a base station which has been selected on the basis of signal quality, without taking into account congestion levels in the cell.

The feedback signal is fed to controller 222, along with the output from the congestion level measurement unit 204. The controller 222 controls the buffer 202 in dependence on the feedback signal and the congestion level measurements. The control is carried out as follows:

If the feedback signal contains the identification number of the base station 200, and the congestion level in the cell is below a certain threshold, then data packets are fed out from the buffer 202. The threshold may be preset, or may be controlled, for example, by the radio resource management algorithm.

If the feedback signal contains the identification number of the base station 200, but the congestion level in the cell is above the threshold, then data packets are not fed out from the buffer 202.

If the feedback signal contains the identification number of another base station (and not that of base station 200) then data packets are not fed out from buffer 202.

The second case, where base station 200 is the selected base station, but does not transmit any data, may result in no data packets being sent to the mobile unit. This situation may be dealt with one or more of the following ways. If the congestion levels are only temporarily high (for a few time slots or radio frames) then, when the congestion levels drop, the output of congestion level measurement unit 204 falls below the threshold, and controller 222 begins to feed data packets out of the buffer 202. If the congestion levels remain high for longer, then the data packets are eventually dropped from the buffer 202, and a signal is sent to the radio network controller (block 24 in FIG. 2) indicating that this has occurred. The radio network controller then attempts to route the data packets via another base station.

Alternatively, the base station may send a signal to the mobile unit indicating that the cell is too congested. This signal may be sent, for example, as part of the control information that is multiplexed with the data by multiplexer 205. On receiving this signal, the mobile unit selects another base station for data transmission.

Alternatively, the base station may send an acknowledgement message to the mobile unit acknowledging that it is the selected base station when data is to be transmitted, but not send this acknowledgement message when data is not to be transmitted. The mobile unit monitors receipt of the acknowledgement message, and if it is not received within a certain time period, it selects another base station. Alternatively, the mobile station may monitor the delay in receiving a data packet from the selected base station, and if this delay is above a certain time period, it may select another base station, even though the other base station may be second best in terms of signal quality.

In either of the above cases, the time period may be predetermined, or it may be varied, for example, in dependence on the difference in the qualities of the signals received from the respective base stations. Thus a short time period may be set where the difference in signal qualities is small, and a long time period set where there is a large difference in signal qualities.

The control mechanism described above may also take into account the priority of the data. Thus, if the data is high priority, the base station may transmit the data regardless of the congestion level, while if the data is low priority the base station may only transmit the data if the congestion level is low.

Figure 8:
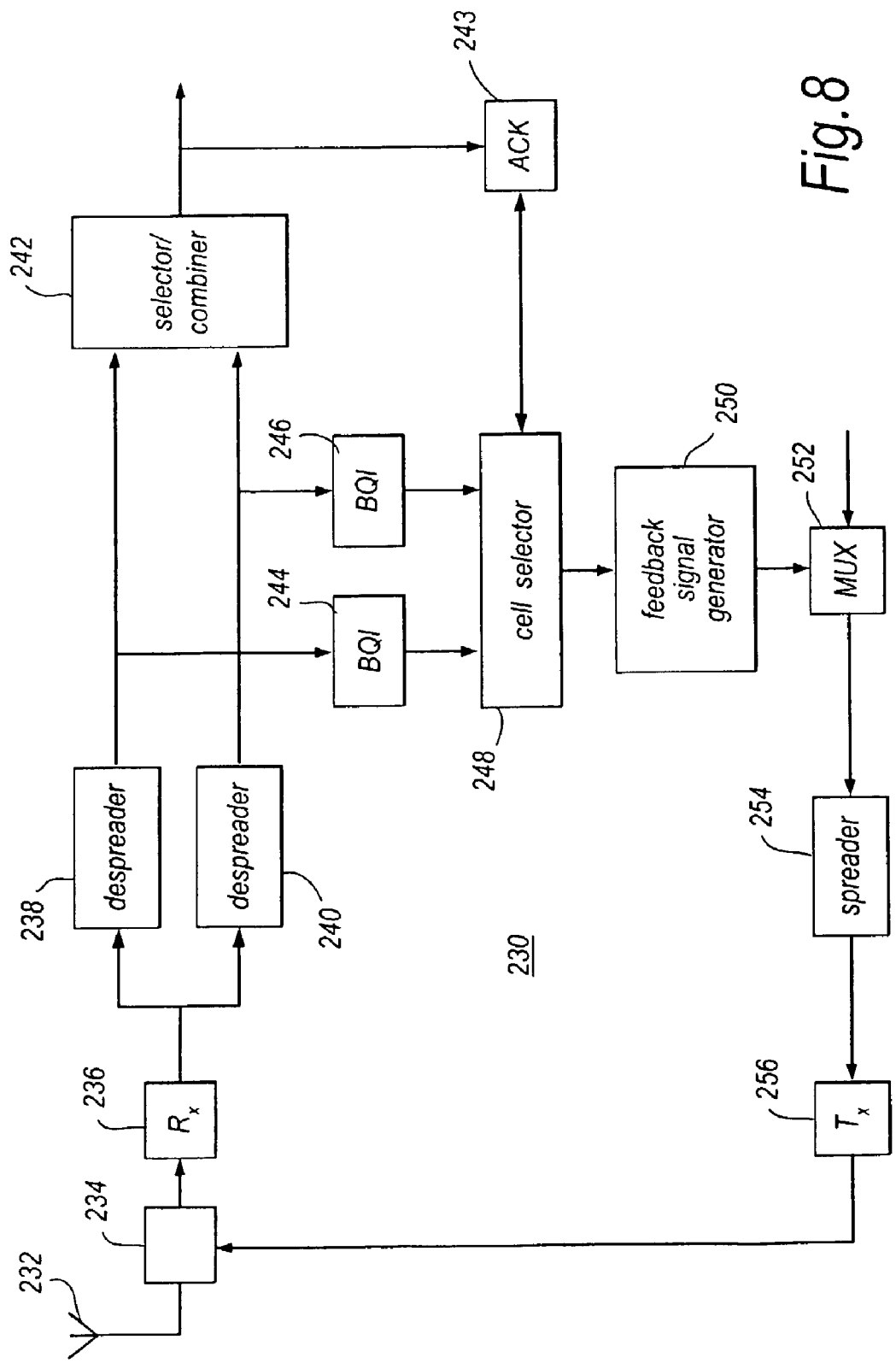
FIG. 8 shows parts of a mobile unit according to the third embodiment.

A mobile unit for use in the third embodiment is shown in FIG. 8. The mobile unit 230 comprises antenna 232, duplexer 234, receiver 236, despreaders 238, 240, selector/combiner 242, acknowledgement unit 243, beam quality indicators 244, 246, cell selector 248, feedback signal generator 250, multiplexer 252, spreader 254 and transmitter 256. Operation of the mobile unit is similar to that of the mobile units described above with reference to FIGS. 4 and 6, and thus is not described here in detail. However, cell selector 248 selects the base station with the best signal quality without taking into account congestion levels.

The third embodiment may provide the advantage that congestion levels are measured at the base station, where they can be more accurately determined, and that it is not necessary to broadcast the congestion levels. However, in certain circumstances, there may be a time delay before any data packets are transmitted to the mobile unit.

5. Fourth Embodiment

In a fourth embodiment of a cell selection technique, the congestion level in a cell is measured by the base station, as in the third embodiment. However, as well as transmitting the identification number of the selected base station, the mobile unit also transmits an indication of the degree of marginality of the decision, and this is taken into account by the base station when deciding whether or not to transmit data to the mobile unit.

A mobile unit for use in the fourth embodiment is shown in FIG. 9. The mobile unit 260 comprises antenna 262, duplexer 264, receiver 266, despreaders 268, 270, selector/combiner 272, beam quality indicators 274, 276, cell selector 278, degree of marginality indicator 280, feedback signal generator 282, multiplexer 284, spreader 286 and transmitter 288.

The antenna 262, duplexer 264, receiver 266, despreaders 268, 270, selector/combiner 272, and beam quality indicators 274, 276 have similar functions to the corresponding parts described above with reference to FIGS. 4 and 6, and thus are not described again here. However, in the present embodiment, the outputs of the beam quality indicators 274, 276 are fed to both the cell selector 278 and to the degree of marginality indicator 280. The cell selector 278 selects the base station which has the best signal quality (as determined by beam quality indicators 274, 276) and outputs the result of the selection to the feedback signal generator 282. The degree of marginality indicator outputs a signal indicating the extent to which the measured beam qualities differ. For example, the degree of marginality indicator may output the actual difference between the measured beam qualities, or some other value indicating the amount of difference. This value is also fed to feedback signal generator 282.

The feedback signal generator 282 produces a feedback signal which comprises the identification number of the selected base station, together with an indication of the degree of marginality of the decision. The feedback signal is multiplexed with a signal for transmission by multiplexer 284, and then transmitted to the active base stations via spreader 286, transmitter 288, duplexer 264 and antenna 262.

A base station for use in the fourth embodiment may be based on that shown in FIG. 7. However, in the fourth embodiment, the controller 222 of FIG. 7 takes into account the degree of marginality of the selection decision when deciding whether or not to feed data packets out from the buffer 202. In this embodiment, the control is carried out as follows.

If the feedback signal contains the identification number of the base station 200, and the degree of marginality is greater than a certain marginality threshold (for example, 0.5 or 1 dB), then data packets are fed out from the buffer 202, regardless of the congestion level in the cell.

If the feedback signal contains the identification number of the base station 200, and the congestion level in the cell is below a certain congestion threshold, then data packets are fed out from the buffer 202, regardless of the degree of marginality.

If the feedback signal contains the identification number of the base station 200, the degree of marginality is less than the marginality threshold, and the congestion level in the cell is above the congestion threshold, then data packets are not fed out from the buffer 202.

If the feedback signal contains the identification number of another base station, but the degree of marginality is less than the marginality threshold (or some other threshold) and the congestion level in the cell is below the congestion threshold (or some other threshold), then, optionally, data packets are fed out from the buffer 202.

In all other cases where the feedback signal contains the identification number of another base station (and not that of base station 200), data packets are not fed out from buffer 202.

As in the previous embodiments, the selection mechanism may also take into account the priority of the data.

In the fourth embodiment, where the selected base station is the only base station with which data transmission is viable (because the selected base station has a significantly better signal quality), the selected base station is used for data transmission regardless of congestion levels. If data transmission with another base station is viable, then the selected base station is only used for data transmission if the cell is not congested. If the base station is not the selected base station, but the difference in signal qualities between the base stations is not large, then the base station may nonetheless be used for data transmission if the cell is not congested. This can allow data transmission to take place even if the selected cell is congested.

The fourth embodiment may result in data packets being transmitted by two base stations (where the cells both have similar signal qualities and low congestion levels) or no data packets being transmitted (where the cells both have similar signal qualities and high congestion levels). In the later case, the situation may be dealt with in a similar way to that described above with reference to the third embodiment.

The various embodiments which have been described above may be implemented using software modules running on a processor, for example a digital signal processor, or any other type of processor. The programming of such modules will be apparent to the skilled person from the description of the various functions. The skilled person will appreciate that such modules may be programmed on any appropriate processor using any appropriate programming language. Alternatively, some or all of the functions described above may be implemented using dedicated hardware.

In some circumstances a base station may divide the area it serves into a plurality of sectors. The term "cell" as used herein should be read as meaning any area of coverage of a base station, which area may be the only area of coverage of that base station, or one of several areas, such as one of several sectors. If a base station receives a selection command from two or more sectors, the selection command may be combined, for example using maximum ratio combining, in order to improve the detection of the selection command.

It will be understood that the present invention has been described above purely by way of example, and modifications of detail can be made within the scope of the invention. For example, the invention may be used with multiplexing techniques other than CDMA, such as time division multiple access (TDMA), frequency division multiplexing (FDM), hybrid TDMA/CDMA, or any other appropriate multiplexing technique.

The invention claimed is:

1. A cellular communications system for carrying out a site selection diversity method, the system comprising:
   a user equipment comprising a processor operable periodically to select a cell for data transmission from a plurality of cells, and a transmitter operable to transmit a result of the selection to a base station; and
   a plurality of base stations, each of which comprises
      a receiver operable to receive a result of a selection,
      a transmitter operable to transmit data to the user equipment, and
      a controller operable to determine whether or not the base station is a selected base station and to delay the transmission of data from the base station to the user equipment, when the base station is the selected base station for the user equipment and a measure of a congestion level in the cell is above a certain threshold, until the measure of the congestion level in the cell is below the certain threshold;
   wherein the processor in the user equipment is operable to select a cell for data transmission based on measures of congestion levels in the cells.

2. A system according to claim 1 wherein the processor in the user equipment is operable to select a cell for data transmission based additionally on measures of signal qualities in the cells.

3. A system according to claim 2 wherein the processor is operable to select a cell which has the lowest congestion level when the difference in measures of signal qualities between two cells is below a certain threshold.

4. A system according to claim 1, wherein each base station comprises a measurement unit operable to measure congestion levels and the transmitter is operable to transmit measures of congestion levels to the user equipment.

5. A system according to claim 4 wherein the measurement unit is operable to determine an amount of data which is to be transmitted by the base station over a predetermined time period.

6. A system according to claim 4 wherein the measurement unit is operable to measure congestion levels based on the occupancy of a buffer containing data to be transmitted.

7. A system according to claim 4, wherein the transmitter is operable to transmit the measures of congestion levels in a broadcast channel.

8. A system according to claim 1 wherein the user equipment comprises a measurement unit operable to measure congestion levels.

9. A system according to claim 8 wherein the measurement unit is operable to measure congestion levels based on the usage of a shared transmission channel.

10. A system according to claim 1 wherein the controller in a base station is operable to control the transmission of data to the user equipment additionally in dependence on a quality of a signal containing the result of a selection which is received by the base station from the user equipment.

11. A system according to claim 1 wherein the processor in the user equipment is operable to select a base station based additionally on a command transmitted by a base station to the user equipment instructing the user equipment not to select that base station.

12. A system according to claim 1 wherein die processor in a user equipment is operable to select a base station based additionally on whether a signal is received by the user equipment from the selected base station within a certain time from the transmission of a result of a selection.

13. A system according to claim 1 wherein the processor in the user equipment is operable to select a base station based additionally on a priority of data which is to be transmitted.

14. A system according to claim 1 wherein the controller in a base station is arranged to control the transmission of data to the user equipment additionally in dependence on a priority of data to be transmitted.

15. A system according to claim 1 wherein the result of a selection comprises an identification number of the selected base station.

16. A system according to claim 1 wherein the user equipment is operable to select a cell for data transmission and to transmit a result of the selection at a rate of more than once per superframe, and the controller in a base station is arranged to determine whether or not the base station is a selected base station at a rate of more than once per superframe.

17. A system according to claim 1, the system being operable to perform fast cell site selection.

18. A base station which carries out a site selection diversity method in a cellular communications system, the base station comprising:
   a measurement unit operable to measure a congestion level in a cell served by the base station;
   a transmitter operable to transmit a measure of the congestion level to a user equipment;
   a receiver operable to receive a result of a selection from the user equipment, the result of a selection indicating a base station to be used for data transmission; and a controller operable to determine whether or not the base station is a selected base station and to delay transmission of data from the base station to the user equipment, when the base station is the selected base station for the user equipment and the measure of the congestion level in the cell is above a certain threshold, until the measure of the congestion level in the cell is below the certain threshold.

19. A base station which carries out a site selection diversity method in a cellular communications system, the base station comprising:
    a measurement unit operable to produce a measure of a congestion level in a cell served by the base station;
    a receiver operable to receive a result of a selection from a user equipment, the result of a selection indicating a base station to be used for data transmission;
    a transmitter operable to transmit data to a user equipment; and
    a controller operable to determine whether or not the base station is a selected base station and to delay the transmission of data from the base station to the user equipment, when the base station is the selected base station for the user equipment and the measure of the congestion level in the cell is above a certain threshold, until the measure of the congestion level in the cell is below the certain threshold.

20. A base station according to claim 19, wherein the controller is operable to suppress data transmission to the user equipment if the measure of a congestion level is above a certain threshold.

21. A base station according to claim 19 wherein the receiver is operable to receive an indication of the degree of marginality of the result of a selection, and the controller is operable to control the transmission of data to the user equipment additionally in dependence on the indication of the degree of marginality.

22. A base station according to claim 19 wherein the controller is operable to control the transmission of data to the user equipment additionally in dependence on a quality of a signal containing the result of the selection which is received by a base station from the user equipment.

23. A base station according to claim 19 wherein the controller is operable to control the transmission of data to the user equipment additionally in dependence on a priority of data to be transmitted.

24. A base station according to claim 19 wherein the transmitter is operable to transmit a command instructing a user equipment not to select that base station.

25. A cellular communications system for carrying out a site selection diversity method, the system comprising a base station and a user equipment, the base station comprising:
    a measurement unit operable to produce a measure of a congestion level in a cell served by the base station;
    a receiver operable to receive a result of a selection from the user equipment, the result of a selection indicating a base station to be used for data transmission;
    a transmitter operable to transmit data to the user equipment; and
    a controller operable to determine whether or not the base station is a selected base station and to delay the transmission of data from the base station to the user equipment, when the base station is the selected base station for the user equipment and the measure of the congestion level in the cell is above a certain threshold, until the measure of the congestion level in the cell is below the certain threshold;
    and the user equipment comprising:
    a receiver operable to receive transmission signals from a plurality of base stations;
    a processor operable to produce measures of qualities of signals received from the base stations, and to select a cell based on measures of signal qualities; and
    a transmitter operable to transmit a result of a cell selection decision to the base stations.

26. A system according to claim 25 wherein the processor in the user equipment is operable to select a base station based additionally on whether a signal is received by the user equipment from the selected base station within a certain time from the transmission of a result of a selection.

27. A system according to claim 25 wherein the processor in the user equipment is operable to determine a degree of marginality of a cell selection decision, and the transmitter in the user equipment is operable to transmit an indication of the degree of marginality to the base station.

28. A cellular communications system for carrying out a site selection diversity method, the system comprising:
    a user equipment comprising means for periodically selecting a cell for data transmission from a plurality of cells, and means for transmitting a result of the selection to a base station; and
    a plurality of base stations, each of which comprises means for receiving a result of a selection, means for determining whether or not the base station is a selected base station, and means for delaying transmission of data from the base station to the user equipment, when the base station is the selected base station for the user equipment and a measure of a congestion level in the cell is above a certain threshold, until the measure of the congestion level in the cell is below the certain threshold;
    wherein the selecting means in the user equipment is arranged to select a cell for data transmission based on measures of congestion levels in the cells.

29. A base station for carrying out a site selection diversity method in a cellular communications system, the base station comprising:
    means for measuring a congestion level in a cell served by the base station;
    means for transmitting a measure of the congestion level to a user equipment;
    means for receiving a result of a selection from the user equipment, the result of a selection indicating a base station to be used for data transmission;
    means for determining whether or not the base station is a selected base station;
    means for delaying transmission of data from the base station to the user equipment, when the base station is the selected base station for the user equipment and the measure of the congestion level in the cell is above a certain threshold, until the measure of the congestion level in the cell is below the certain threshold.

30. A base station for carrying out a site selection diversity method in a cellular communications system, the base station comprising:
    means for producing a measure of a congestion level in a cell served by the base station;
    means for receiving a result of a selection from a user equipment, the result of a selection indicating a base station to be used for data transmission;
    means for determining whether or not the base station is a selected base station;
    means for delaying transmission of data from the base station to the user equipment, when the base station is the selected base station for the user equipment and the measure of the congestion level in the cell is above a certain threshold, until the measure of the congestion level in the cell is below the certain threshold.

31. A site selection diversity method for use in a cellular communications network, the method comprising the steps of:
- in a user equipment, periodically selecting a cell for data transmission from a plurality of cells and transmitting a result of the selection to a base station; and
- in a base station, receiving a result of a selection, determining whether or not the base station is a selected base station and delaying transmission of data from the base station to the user equipment, when the base station is the selected base station for the user equipment and a measure of a congestion level in the cell is above a certain threshold, until the measure of the congestion level in the cell is below the certain threshold;
- wherein a cell for data transmission is selected based on measures of congestion levels in the cells.

32. A site selection diversity method for use in a base station of a cellular communications network, the method comprising the steps of, in the base station:
- producing a measure of a congestion level in a cell served by the base station;
- receiving a result of a selection from a user equipment, the result of a selection indicating a base station to be used for data transmission;
- determining whether or not the base station is a selected base station;
- delaying transmission of data from the base station to the user equipment, when the base station is the selected base station for the user equipment and the measure of the congestion level in the cell is above a certain threshold, until the measure of the congestion level in the cell is below the certain threshold.

33. A site selection diversity method for use in a cellular communications network, the method comprising the steps of:
- producing a measure of a congestion level in a cell served by the base station;
- receiving a result of a selection from a user equipment, the result of a selection indicating a base station to be used for data transmission;
- determining whether or not the base station is a selected base station;
- delaying transmission of data from the base station to the user equipment, when the base station is the selected base station for the user equipment and the measure of the congestion level in the cell is above a certain threshold, until the measure of the congestion level in the cell is below the certain threshold.

* * * * *